United States Patent
Porter

[11] 3,765,156
[45] Oct. 16, 1973

[54] TURTLE GRASS HARVESTER
[76] Inventor: Wellington W. Porter, I.R.D. No. 2, Dublin Rd., Waterloo, N.Y. 13165
[22] Filed: Dec. 10, 1970
[21] Appl. No.: 96,816

[52] U.S. Cl. .......................................... 56/8, 37/54
[51] Int. Cl. ................................ A01d 45/08
[58] Field of Search .................. 56/8, 9, 208–217, 56/17.2; 37/54, 55, 71; 172/392, 393, 19

[56] References Cited
UNITED STATES PATENTS

| | | | |
|---|---|---|---|
| 1,120,206 | 12/1914 | Knapp | 56/9 |
| 2,322,865 | 6/1943 | McDermott | 56/8 |
| 1,839,380 | 1/1932 | Druppel | 56/8 |
| 3,577,714 | 5/1971 | Dahl | 56/17.2 |
| 2,608,043 | 8/1952 | Berdan | 56/17.2 |
| 2,385,568 | 9/1945 | Draim | 56/17.2 X |
| 3,038,287 | 6/1962 | Vincent | 56/10.7 |

FOREIGN PATENTS OR APPLICATIONS

| | | | |
|---|---|---|---|
| 699,986 | 12/1930 | France | 56/8 |
| 646,659 | 7/1937 | Germany | 56/8 |
| 557,697 | 3/1968 | Switzerland | 56/8 |

*Primary Examiner*—Louis G. Mancene
*Assistant Examiner*—J. A. Oliff
*Attorney*—F. P. Keiper

[57] ABSTRACT

Underwater marine harvester for turtle grass and the like having a transverse member mounted on the deck of a vessel and extending beyond the sides of the vessel with an upright at each end, a frame of a width approximately the spacing between said uprights, parallelogram pull linkages including the uprights and frame for drawing the frame through the water, a sickle bar cutter disposed across the bottom of said frame and facing toward the transverse member, power means for actuating said cutter, means for raising and lowering the frame, a plurality of shoes pivotally attached to the frame and disposed behind the cutter, power means for setting the angle of said shoes, and a transverse wing extending across and pivoted to the frame, and power means for setting the angle of the wing.

5 Claims, 7 Drawing Figures

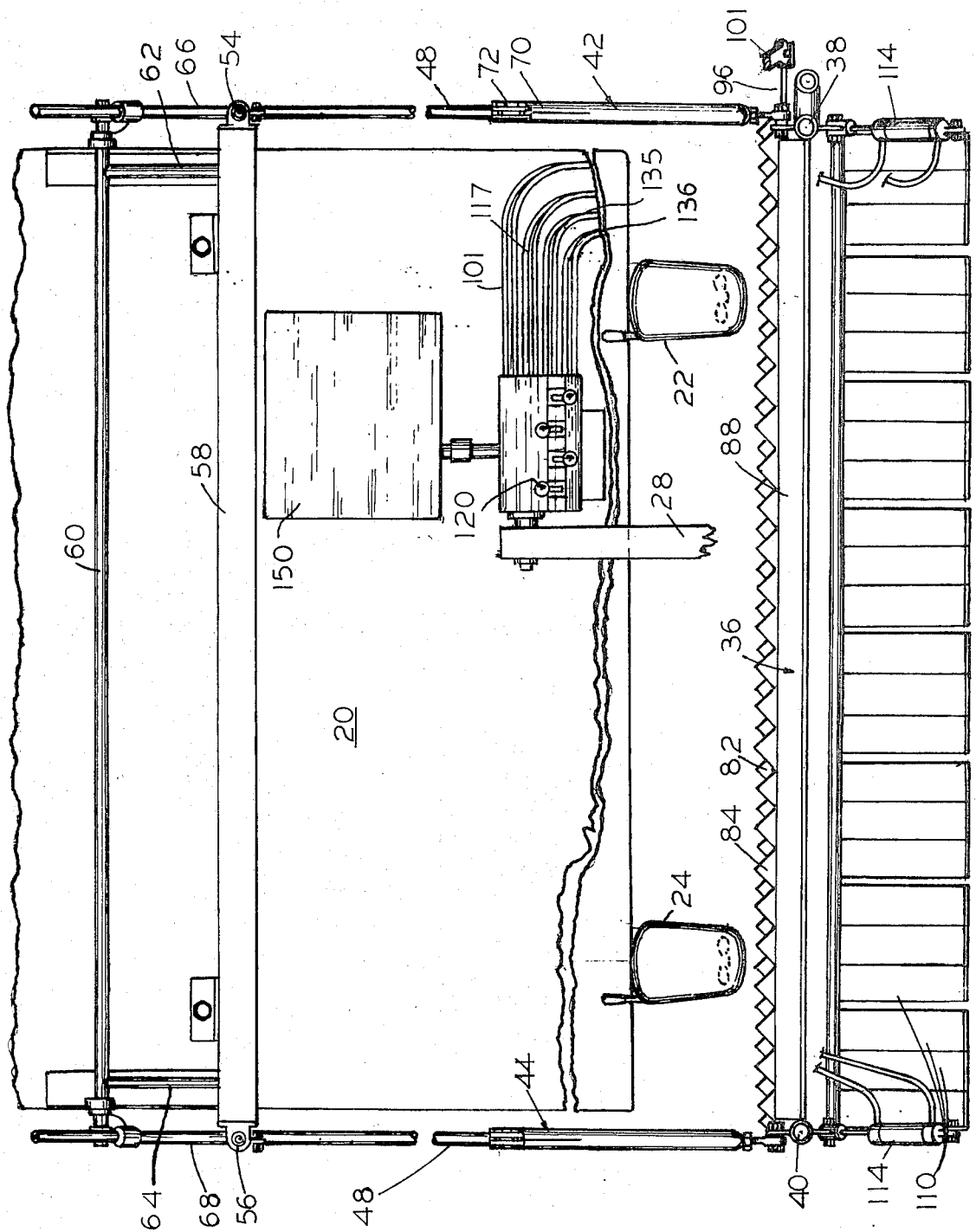

TURTLE GRASS HARVESTER

This invention relates to an under water harvester for turtle grass and the like.

The present invention is directed to apparatus capable of being drawn over an area having submerged marine vegetation and cutting the same free at or close to the bottom or at a predetermined space thereabove, and from three to twelve feet below the water surface. The cut grass or vegetation tends to rise to the surface and is thus readily gathered for use by trailing apparatus. The invention employs a power operated cutter which is held submerged by an adjustable power actuated vane, and which may freely follow the bottom terrain contour by being freely mounted to rock or tilt in response to the feel of trailing shoes which act as a bottom sensing means, such shoes being power adjusted to control the cutting height above the marine bottom.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIG. 7 is a plan view of the barge and cutter assembly with the linkage cut away.

Figure 1:
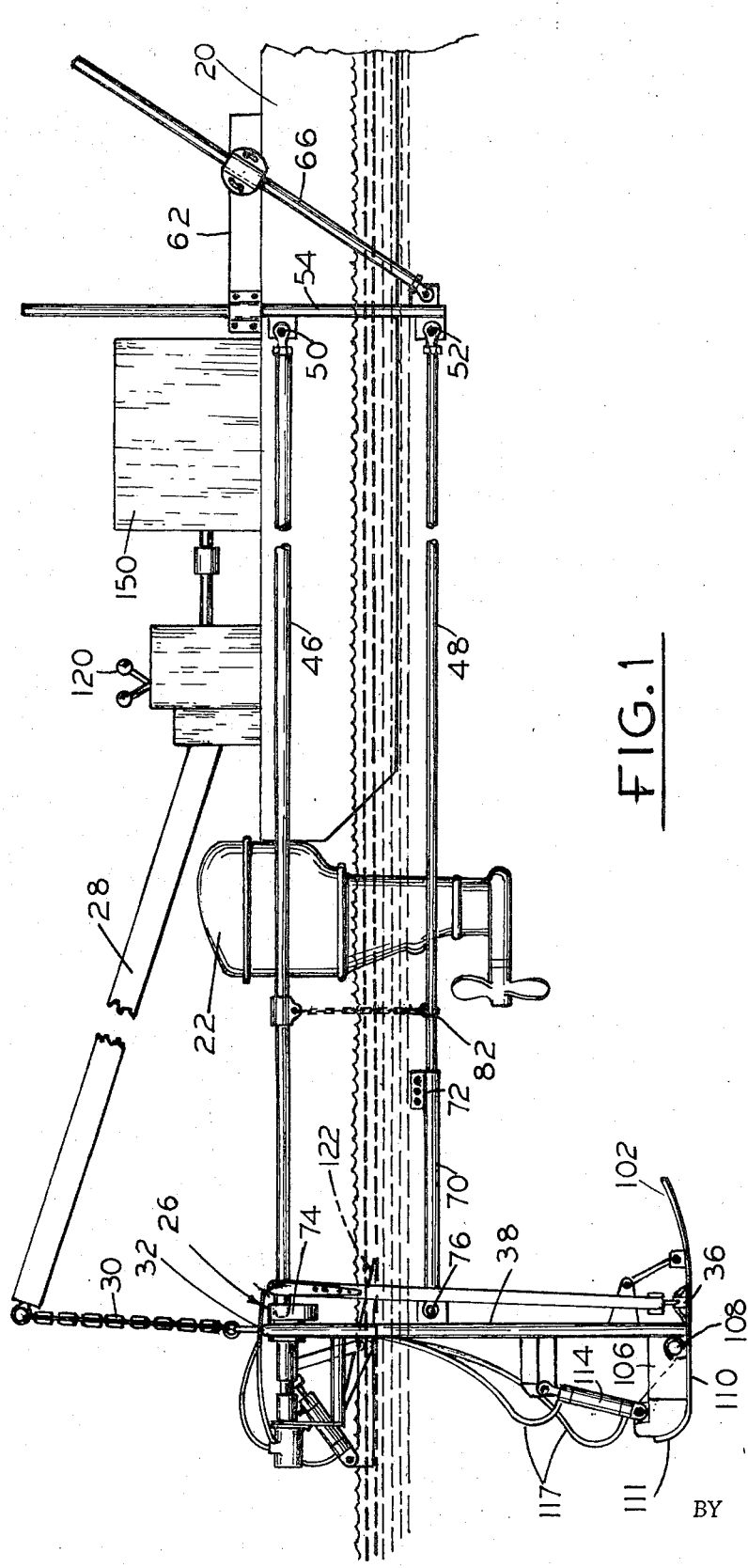
FIG. 1 is a side elevation of the turtle grass cutter supported at a fixed depth.

Referring to the drawings there is shown a barge 20, which may be propelled by outboard motors 22 and 24, or other suitable means. Trailing behind the barge is a cutter assembly 26 which may be raised or lowered by a hydraulicly actuated boom 28, from which the assembly is suspended by a chain 30. The barge may have a glass bottom viewing area to facilitate observation.

Figure 2:
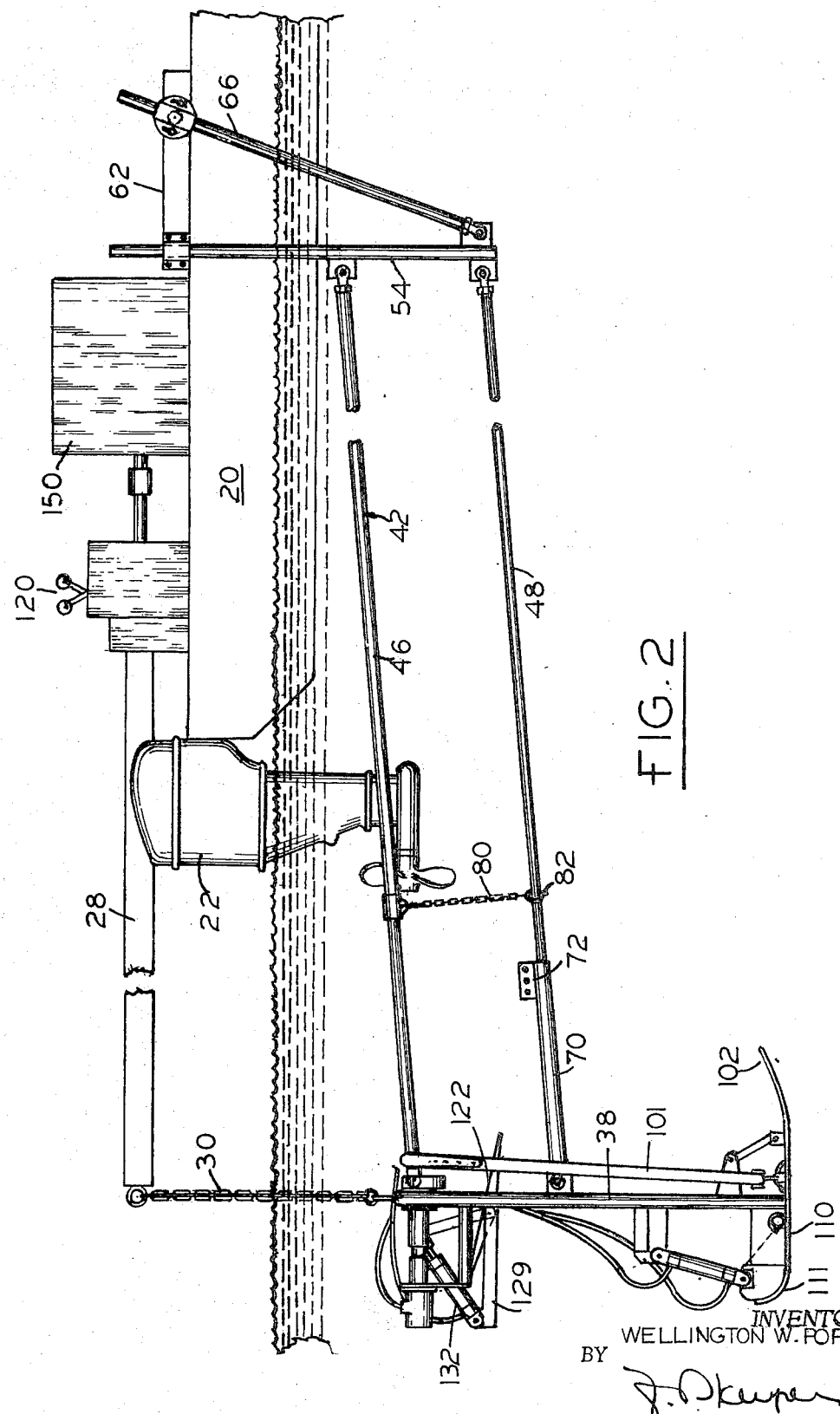
FIG. 2 is a side elevation of the cutter in lowered position.
Figure 3:
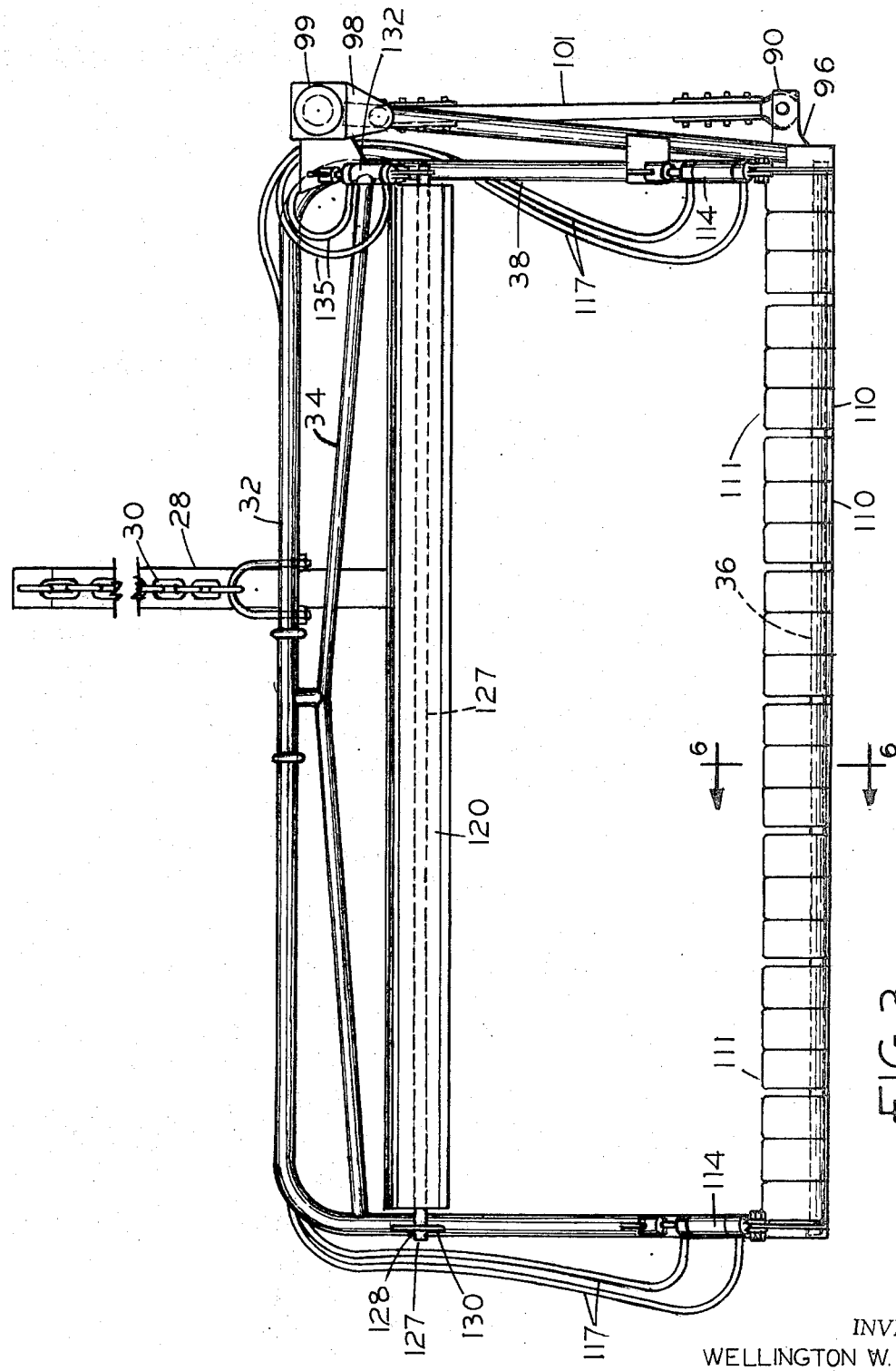
FIG. 3 is a rear elevation of the cutter arch frame assembly.
Figure 4:
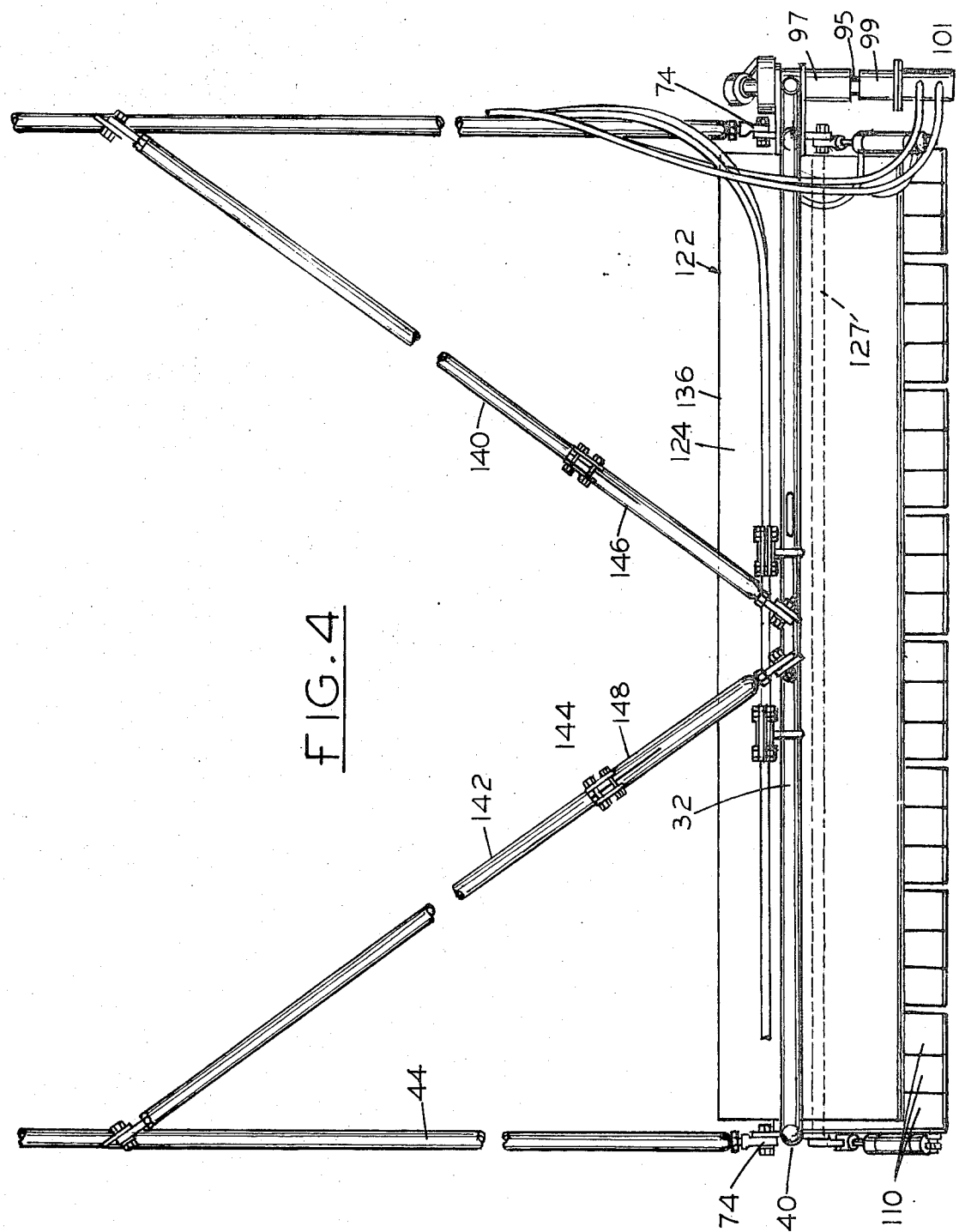
FIG. 4 is a plan view of the cutter frame assembly.
Figure 5:
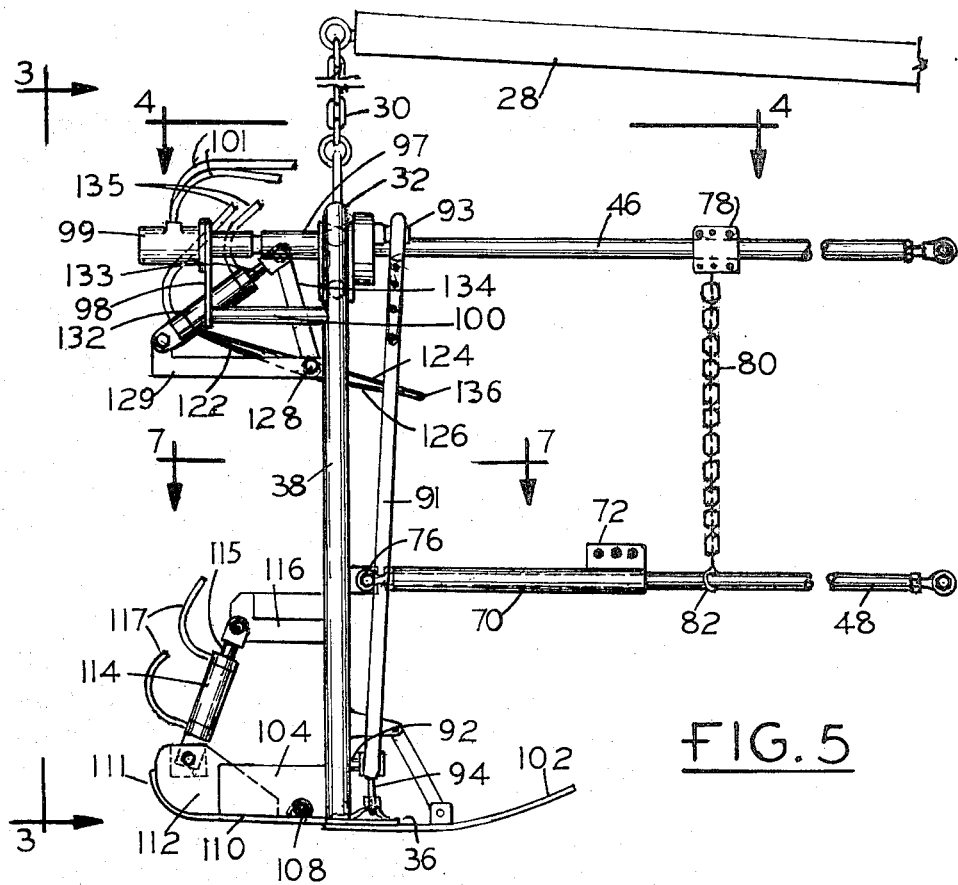
FIG. 5 is an enlarged side elevational view of the cutter assembly.
Figure 6:
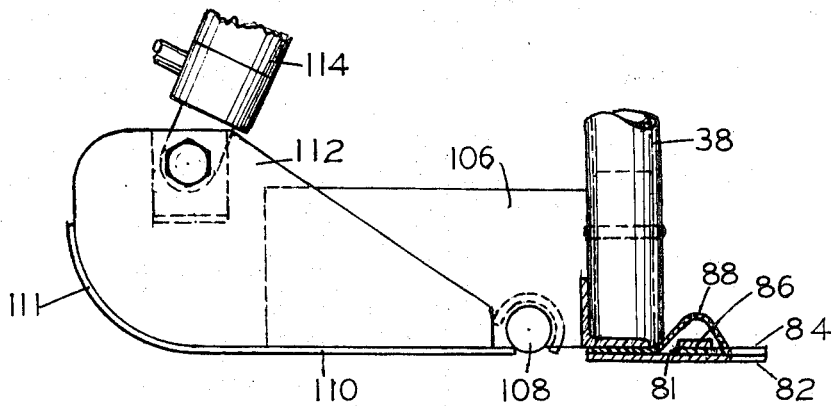
FIG. 6 is a fragmentary sectional view of the cutter bar and show taken in the line 6—6 of FIG. 3.

As seen in FIG. 3, the cutter assembly comprises an arched frame 32 braced as at 34, and having a sickle bar cutter assembly 36 affixed to and tying together the lower ends of the vertical portions 38 and 40 of the frame 32. The frame 32 is secured so as to trail at a suitable distance behind the barge through parallelogram like linkages 42 and 44 disposed on opposite sides of the barge, each linkage comprising a top pull tube 46 and a bottom pull rod 48. The forward ends of the tube and rod of each linkage are secured through ball joint type swivel bearings 50 and 52 affixed to the lower portion of each of the vertical tubes 54 and 56 which tubes, on either side of the barge, are securely clamped to the ends of a transverse box beam 58 extending across and secured to the barge as indicated in FIG. 7. A second transverse member 60 forward of the beam 58 is secured to the barge, and connected to the beam by struts 62 and 64. Adjustably secured to the end of the member 60, are diagonal braces 66 and 68 extending to the lower ends of the vertical tubes 54 and 56. As is indicated in FIG. 2, the vertical tubes and braces 66 and 68 may be adjusted so as to lower or raise the swivel pivots for the top pull tubes 46 and the lower pull rods 48. In practice the pull tubes 46 may be as long as nineteen feet.

The rear end of the lower pull rods are telescopically received in sleeves 70 having split clamping means 72, and the rear ends of the top pull tubes and the sleeves 70 are attached through ball joint type swivel bearings 74 and 76 to the upper ends of the side members 38 and 40 of the arch. Each top pull rod may be provided with stabilizer clamp 78 from which depends a rod support chain 80 having at its lower end a sliding ring 82 through which the bottom pull rods extend.

The cutter assembly 26 comprises a stationary transverse bar 81 having cutter teeth 82 and a reciprocating cutter bar having teeth 84, the cutter bar 86 being held down by a bar guide 88.

The sickle bar 86 is reciprocated by bell crank 90 pivotally mounted as at 92 on the frame member 36, the bell crank 90 having an arm 94 extending to the cutter bar 86, and an arm 96 connected to a pitman 91 extending to a crank pin 93 on the end of a shaft 93 journalled in a bearing sleeve 97, and driven by a hydraulic motor 99 fed by a hydraulic line 101 flow through which may be reversed to relieve any cutter bar jamming having a torque arm 98 extending to a strut 100. A forward and upwardly extending shoe 102 may be provided at either end of the transverse bar 81, and if desired cultivator wheels (not shown) may be employed.

Extending rearwardly from the lower end of each of the members 38 and 40 are plates 104 and 106 in which is journalled a transverse shaft 108 to which are welded a plurality of trailing shoes 110, such shoes being curved upwardly as at 111 at their rear. Each end shoe is provided with a plate 112 to which is pivotally attached the lower end of a hydraulic cylinder 114, the piston rod of 115 of which extends to brackets 116 affixed to the members 38 and 40. The hydraulic struts 114, may be extended or retracted by introducing hydraulic fluid to one end or the other of the cylinders by conduits 117 leading to control valves at 120 on barge. By extending the struts 114, the trailing shoes are all angularly inclined downward to ride on the floor of the harvest area and cause the cutter to ride above the floor bottom.

A wing 122, or hydrofoil having aqua planing surfaces 124 and 126 is provided with a shaft 127 that is pivotally mounted as at 128 between rearwardly extending arm 129 and bracket 130 extending rearwardly from each of the members 38 and 40. The arm 129 is provided with a swivel connection to a hydraulic cylinder 132, the piston 133 of which extends to a crank arm 134 affixed to the shaft 127 and wing 122. By hydraulic actuation of the cylinder 132 through conduits 135 also leading to the control valves at 120. The angle at which the wing is set, when submerged, will control the downward thrust, which may be desirable to hold the cutter close to the bottom, and cause the shoes to ride on the harvest area bottom. On the other hand the wing may be set level so as to merely steady the operation, or its forward edge 136 may be tilted upwardly to quickly lift the cutter assembly, when there is forward motion through the turtle grass harvest area.

In practice the cutter assembly frame may be braced as at 140 and 142 by rods extending to the pull tubes 42 and 44, the rods being adjustably clamped as at 144 in tubular members 146 and 148 extending to the center of the arch.

The barge is provided with a source of hydraulic fluid in the form of an engine driven pump system indicated at 150 which is connected through control valves as at 120 to control the drive of the cutter bar, the angular adjustment of the shoes 110, the angle of the wing 122, or the actuation of the boom or crane arm 28. Employing long links 46 and 48 permits operation of the cutter at a wide range of depths, which range may be increased by extending the members 54 and 56 downwardly as is indicated in FIG. 2. The clamps 72 may be frictionally tightened to such a degree as to yield should the lower end of the cutter assembly strike a submerged impediment such as a rock or other hidden object. At the same time, the adjustment of the length of the rods 72 may be employed to vary the arch from a vertical plane to one inclined forwardly or rearwardly as desired. The apparatus may be designed to cut a 12 foot swath as it is drawn over the marine bottom.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. Harvesting apparatus for cutting vegetation growing from the bottom of a body of water, said apparatus comprising, in combination:
   a. float means movable across the surface of the water;
   b. frame means supported on said float means for movement between elevated and lowered positions;
   c. a substantially horizontal sickle bar cutter supported at the lowermost portion of said frame means for movement therewith and transversely disposed with respect to the direction of movement of said float means;
   d. shoe means attached to said frame rearwardly adjacent said cutter;
   e. extensible and retractable actuator means attached between said frame and said shoe means to selectively adjust the vertical distance between the lower side of said shoe means and said lowermost portion of said frame, and thereby said cutter; and
   f. means operable from the top of said float means for selectively extending and retracting said actuator means.

2. The invention according to claim 1 wherein said shoe means are fixedly attached to a rod extending across said lowermost portion of said frame means, said shoe means extend rearwardly from and said cutter is mounted forwardly of and substantially parallel to said rod, and said actuator means are operable to rotate said shoe means about an axis through said rod.

3. The invention according to claim 1 and further including adjustable wing means having a hydrofoil surface for engaging the water, in at least said lowered position of said frame means, as said float means is moved thereacross to exert a force on said frame means tending to raise or lower the same, depending on the adjustment of said wing means.

4. The invention according to claim 3 and further including second actuator means operable from the top of said float means for selectively adjusting said wing means.

5. The invention according to claim 1 wherein said frame means includes a first support member upon which said cutter and said shoe means are supported, and upper and lower second support members extending parallel to one another from pivotal attachments to said first support member, said upper second support member being of fixed length and said lower second support member being of variable length.

* * * * *